United States Patent
Dumas et al.

(10) Patent No.: US 10,802,276 B2
(45) Date of Patent: Oct. 13, 2020

(54) DISPLAY SYSTEM, RELATED DISPLAY METHOD AND COMPUTER PROGRAM

(71) Applicant: Thales, Courbevoie (FR)

(72) Inventors: Pierre-Yves Dumas, Valence (FR); Thierry Ganille, Merignac (FR); Bruno Aymeric, Merignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/140,131

(22) Filed: Sep. 24, 2018

(65) Prior Publication Data
US 2019/0094538 A1 Mar. 28, 2019

(30) Foreign Application Priority Data
Sep. 22, 2017 (FR) ...................... 17 00973

(51) Int. Cl.
| | |
|---|---|
| *H04N 7/18* | (2006.01) |
| *G09G 5/00* | (2006.01) |
| *G02B 27/01* | (2006.01) |
| *G06K 9/00* | (2006.01) |
| *G01C 21/06* | (2006.01) |

(52) U.S. Cl.
CPC ........... *G02B 27/017* (2013.01); *G01C 21/06* (2013.01); *G06K 9/00671* (2013.01); *G06K 9/00798* (2013.01); *G02B 2027/014* (2013.01); *G02B 2027/0138* (2013.01)

(58) Field of Classification Search
CPC .................................................. G02B 27/017
See application file for complete search history.

(56) References Cited

U.S. PATENT DOCUMENTS

| | | | |
|---|---|---|---|
| 7,474,962 B2 | 1/2009 | Waid et al. | |
| 2003/0130778 A1* | 7/2003 | Hrovat | B60R 16/0233 |
| | | | 701/45 |

(Continued)

FOREIGN PATENT DOCUMENTS

| | | |
|---|---|---|
| FR | 2719920 A1 | 11/1995 |
| WO | 2008034195 A1 | 3/2008 |

OTHER PUBLICATIONS

Leonard et al., "Simultaneous Map Building and Localization for an Autonomous Mobile Robot", IEEE/RSJ International Workshop on Intelligent Robots and Systems IROS '91, Nov. 3-5, 1991, pp. 1442-1447.

(Continued)

*Primary Examiner* — Nan-Ying Yang
(74) *Attorney, Agent, or Firm* — Thompson Coburn LLP; Thaddeus J. Blenke

(57) ABSTRACT

The invention relates to a display system included in a device for traveling a path between at least two distinct points and for using at least one heading datum, wherein the display system comprises at least:
an image sensor configured to acquire environmental images during the path traveled by the device;
an image processing module capable of determining the drift of the device in real time;
a module for determining information that is representative of the route taken by the device,
a module for real-time determination of the true heading followed by the device from the information that is representative of the route and the drift of the device,
a module for returning to the user information that is representative of the true heading.

10 Claims, 2 Drawing Sheets

(56) References Cited

U.S. PATENT DOCUMENTS

| | | | | |
|---|---|---|---|---|
| 2006/0244744 A1* | 11/2006 | Kandori | ............... | A61B 5/1124 |
| | | | | 345/418 |
| 2010/0231705 A1* | 9/2010 | Yahav | .................... | G02B 27/01 |
| | | | | 348/115 |
| 2010/0268452 A1* | 10/2010 | Kindo | .................... | G01C 21/30 |
| | | | | 701/533 |
| 2011/0093194 A1* | 4/2011 | Paik | ....................... | G01C 21/32 |
| | | | | 701/532 |
| 2015/0253932 A1* | 9/2015 | Inoue | ...................... | G06F 1/169 |
| | | | | 345/175 |
| 2017/0270805 A1 | 9/2017 | Parker et al. | | |

OTHER PUBLICATIONS

Nister et al., "Visual Odometry", Proceedings of the 2004 IEEE Computer Society Conference on Comnputer Version and Pattern Recognition, 2004, 8 pgs.
Preliminary Research Report, FR 1700973 dated Jun. 15, 2018.
Rublee et al, "ORB: An Efficient Alternative to SIFT or SURF", 2011 International Conference on Computer Vision, 2011, 9 pgs.

\* cited by examiner

DISPLAY SYSTEM, RELATED DISPLAY METHOD AND COMPUTER PROGRAM

The present invention relates to a display system included in a device that is capable of moving between two distinct points and capable of using at least one heading datum, in particular a head-up display system, helmet-mounted head-up or even head down.

The invention also relates to a display method implemented by such a display system.

The invention also relates to a computer program comprising software instructions which, when executed by a computer, implement such a display method.

The invention offers many applications, in particular the use of a true heading to improve the view of a user of a device, wherein the user is able to monitor both the environment in which it moves as well as information provided by the instruments of the device by means of the device or by wearing the device.

In fact, the true heading is a fundamental element for air, sea, space or ground navigation when the device is housed or embedded in a vehicle (i.e. the displacement of the device corresponds to that of the vehicle), or for applications in the field of virtual reality or augmented reality when the device is, for example, an electronic display system comprising an electronic device, for example, a smartphone that is removable or integrated in a helmet, with or without a display screen, and a helmet comprising a support to receive the electronic device, a surface bearing against the user's face, facing their eyes, and one or two optical devices arranged between the receiving support and the bearing surface. In other words, in the latter case of the application of virtual or augmented reality, the device is able to travel a route because of its being borne by a user.

It is known to obtain a magnetic heading using a magnetometer that is generally integrated in low-cost AHRS (Attitude and Heading Reference System) and then correct it using a magnetic declination table to derive a true heading.

However, the already poor intrinsic performance of the magnetometer is generally degraded after installation in a vehicle capable of using data corresponding to the heading, such as an aircraft, a ship (submersible, such as a submarine, or non-submersible) or a spatial or terrestrial vehicle.

A heading error of two or three degrees is common. This inaccuracy is generally acceptable for an air, sea, space or ground navigation application (because it is compensated for by the use of ground beacons or GPS waypoints to recalibrate the trajectory) or in the case of the conformal projection of a symbology and/or of a synthetic head-down image.

However, such a heading inaccuracy becomes disruptive for the pilot, or even a source of error, in the case of the conformal projection of a symbology and/or of a synthetic head-up image superimposed on the moving environment, or on the mounted head-up image (which must be coherent with the external vision of the traveling environment and requires a precise true heading).

For vehicles, equipped only with an AHRS (Attitude and Heading Reference System), in particular certain helicopters or other turboprops, the interest of the projection of head up or helmet-mounted information is limited, because of the inaccuracy of the true heading currently obtained.

To remedy this, a first solution is to replace the assembly formed by the center(s) (or sensor(s)) of the low cost AHRS type and magnetometer by an inertial unit to provide a true heading with the desired accuracy directly. However, this solution has a prohibitive acquisition cost when compared with the overall cost of the carrying device in question.

A second solution is to search with the help of a video sensor in the external image of the known points of interest (track, relief) and recalibrate them with a synthetic position calculated from the heading delivered by the reference station of the low-cost AHRS type, wherein the recalibration allows the heading to be corrected.

Nevertheless, this second solution requires the use of a precise database containing the position of the points of interest. In addition, the visibility conditions must allow one to see sufficiently far to distinguish such points of interest, which makes this second solution complicated to implement or inoperable in case of poor visibility.

The invention therefore aims to address the problems of optimizing the visualization of a vehicle user by monitoring both its environment at the same time as information provided by its onboard instruments.

To this end, the object of the invention is a display system included in a device, wherein the device is able to travel along a path between at least two distinct points and to use at least one heading datum, wherein the display system comprises at least:
- an image sensor capable of acquiring environmental images along the path traveled by the device;
- an image processing module capable of determining the drift of the device in real time;
- a module for determining information that is representative of the route followed by the device,
- a module for real-time determination of the true heading followed by the device on the basis of information that is representative of the route and of the drift of the device,
- a module for return to the user of information representative of the true heading.

According to particular embodiments, the display system comprises one or more of the following characteristics, taken separately or in any technically feasible combination:
- the module for return to the user is a display module that is able for recalibrating a synthetic image and/or a conforming symbology in the line of sight of the device associated with the true heading, wherein the display module belongs to the group comprising at least:
  - a head-up display module capable of projecting the synthetic head-up image of the device;
  - a head-up display module capable of projecting the synthetic head-up image borne by at least one user of the device;
  - a head-down display module capable of projecting the synthetic head-down image of the device;
- the image processing module comprises an image analysis tool capable of automatically determining the drift of the device by analyzing at least two successive images, wherein the drift is obtained from the angle of displacement of the pixels between one image and another, wherein the angle of displacement of the pixels is associated with the angle between the longitudinal displacement and the lateral displacement of the device;
- the image analysis tool is an optical odometer tool;
- the image sensor is pointed towards the ground;
- the field of view of the image sensor may be reconfigured according to the instantaneous roll rate and/or the instantaneous pitch rate of the device and/or according to the phase of the journey made by the device;
- the image sensor is integral with the axes of the device or is gyro-stabilized;

the image processing module comprises an image correction tool capable of correcting the images acquired before or after their analysis.

The invention also relates to a display method implemented by the display system according to the present invention, wherein the method comprises:
- the acquisition of environmental images along the path traveled by the device;
- image processing able to determine the drift of the device in real time;
- determination of information representative of the route followed by the device,
- real-time determination of the true heading followed by the device from the information representative of the route and the drift of the device,
- the return to the user of information representative of the true heading.

The invention also relates to a computer program comprising software instructions which, when executed by a computer, implement a method as defined above.

The invention and its advantages will be better understood upon reading the following detailed description of a particular embodiment, given solely by way of a non limiting example, wherein this description is made with reference to the appended drawings, wherein.

In the remainder of the description, the term "substantially" will express a relationship of equality plus or minus 10%. In addition, the term "device" means a device capable of moving between two distinct points and that is capable of using at least one heading datum.

For example, such a device corresponds to:
- a vehicle, such as an aircraft, a ship (submersible or non-submersible), a space vehicle or a land vehicle, or
- an electronic display system borne by a user along a path between two distinct positions.

Subsequently, for reasons of simplification, an example is used according to which the device corresponds to an aircraft, such as a helicopter or a turboprop, wherein such an aircraft is, for example, only provided with a low-cost AHRS (Attitude and Heading Reference System) and without an inertial unit, or is an electronic display system borne by a user on board an aircraft (i.e. a pilot or crew member of the aircraft).

Figure 1:
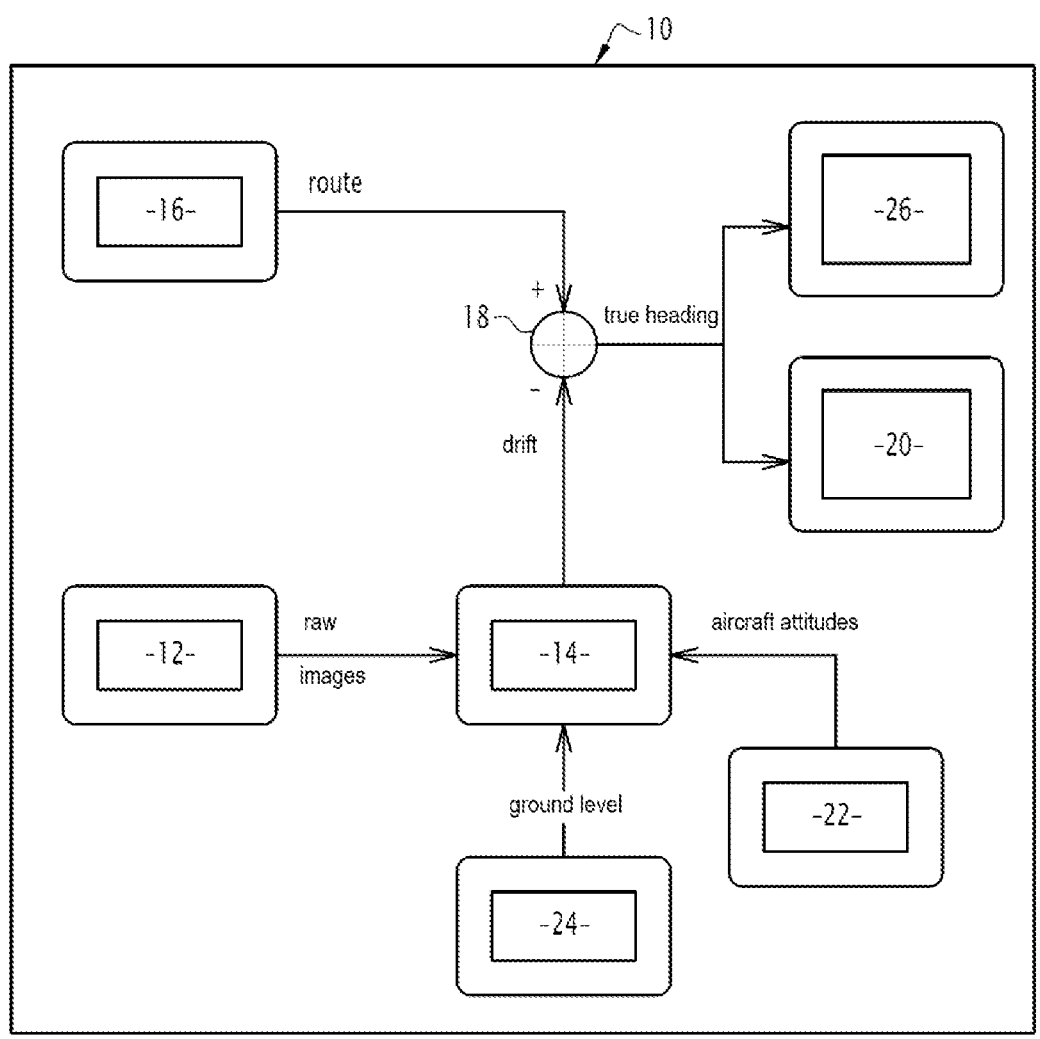
FIG. 1 shows a block representation of the display system according to the invention.

With reference to FIG. 1, the display system 10 of such a device according to the present invention, comprises at least one image sensor 12 that is capable of acquiring environmental images along the path traveled by an aircraft, an image processing module 14 capable of determining the drift of the aircraft in real time, a module 16 for determining information that is representative of the route followed by the aircraft, a module 18 for real-time determination of the true heading followed by the device from the information that is representative of the route, and the drift of the device, a module 20 for return to the user of information that is representative of the true heading.

The image sensor 12 is, for example, integrated in a camera. The image sensor 12 is, for example, associated with an optical objective, for example a fisheye lens, i.e. covering a visual field with a large angle of view of the order 180° or more. The camera comprises the image sensor(s) and lens positioned in front of the image sensor(s) so that the image sensor(s) capture(s) the images through the lens.

Such an image sensor 12 is capable of being calibrated automatically or manually in order to compensate for deformations related to the optical lens with which it is associated.

The image sensor 12 is, for example, an infrared (IR) sensor, a radar, or a LIDAR ("light detection and ranging" or "laser detection and ranging"), and is capable of delivering images in color (i.e. polychrome image sensor) or, alternatively, monochrome images.

In one particular aspect, the image sensor 12 is configured to maximize the vision of the ground overflown by the aircraft.

To do this in the case of a device corresponding to an aircraft, the image sensor 12 is advantageously pointed towards the ground in order to increase the probability of detection of the terrain (vertical visibility is generally better than horizontal visibility).

According to a first variant, the camera comprising the image sensor 12 is mounted under the carrier corresponding to the aircraft (i.e. outside the cockpit on the lower surface of the cabin of the aircraft). Such a position of the image sensor 12 maximizes ground vision and relevant points of interest overflown by the aircraft.

According to a second variant, the image sensor 12 (i.e. as well as the camera comprising it) is fixed on the cabin at the level of the cockpit while remaining outside it.

According to these two variants, the image sensor 12 is then fixed so as to be integral with the axes of the aircraft.

According to a third variant, the image sensor 12 (i.e. as well as the camera comprising it) is fixed in the cockpit, for example by means of a suction cup on the windshield. In this case, the camera comprising the image sensor 12 will not necessarily be oriented along the axes of the aircraft because it is fixed by the pilot without a precise reference. The drift measured by means of the image sensor 12 will thus include a bias as a function of the viewing angle of the image sensor 12.

However, as long as the camera remains attached to the reference frame of the aircraft from which the low-cost AHRS 22 calculates the attitude information, it is still possible to recalibrate the head-up/supported head-up image with the external environment. To do this, a harmonization correction between the axes of orientation of the camera and the axes of the aircraft will, for example, be performed automatically or manually during installation.

According to a fourth variant, the image sensor 12 is mounted on a helmet worn by the pilot of the aircraft, for example the helmet of a head-up system capable of projecting a synthetic image, comprising information for assisting the piloting of the aircraft in order to be visually superimposed on the pilot's visual field of navigation. According to this fourth variant, as detailed below, the image processing module 14 then comprises (an) image correction tool(s) capable of correcting the images acquired by the image sensor 12 through re-projection of these in a geographical horizontal plane (i.e. re-projection in a predetermined common reference for the processing of all acquired images). The implementation of such a fourth mounted variant of the image sensor 12 is advantageous because it takes advantage of the mobility possibilities of the driver's head which instinctively tends to look in the direction of external visual cues visible in actual flight conditions.

As an alternative, the image sensor 12 may be gyro-stabilized, which makes it possible to overcome any need for re-projection and any associated re-projection errors.

According to another variant for aircraft already equipped with at least one camera comprising an EVS (Enhanced Vision System) image sensor 12, the existing camera is advantageously used for the implementation of this invention. Such EVS image sensors 12 are, for example, fixed and mounted in the axis of the aircraft or offset, or are mobile sensors (e.g. optronic ball).

According to another variant, a plurality of image sensors 12 is implemented, wherein these image sensors 12 are, for example, activated manually alternately or simultaneously by the pilot, or automatically in a predetermined manner as a function of the phase of flight of the aircraft and/or trim (angle of attitude of the aircraft).

Furthermore, according to an alternative embodiment, the field of view (FOV) of the image sensor 12 may be reconfigured according to the instantaneous roll rate and/or the instantaneous pitch rate of the aircraft and/or according to the flight phase (i.e. the travel phase) of the aircraft, in order to ensure a sufficient number of common pixels between two images captured successively.

The instantaneous roll rate and/or the instantaneous pitch rate of the aircraft and/or the current phase of flight is, for example, delivered in real time by the low-cost AHRS 22 to a tool for reconfiguring the display system 10 (not shown) of the field of view obtained from the image sensor 12. Such a variation of the field of view (FOV) is implemented, in particular, in order to obtain a succession of images that are sufficiently different from each other to allow matching of points between these images. For example, as the scroll speed is lower at high altitude, the field of view is reduced to maintain the possibility of such matching. In other words, such a reconfiguration corresponds to the implementation of a feedback control according to the instantaneous roll rate and/or the instantaneous pitch rate of the aircraft.

Moreover, according to one particular aspect, such a visual field reconfiguration tool is capable of correcting in real time the potential optical distortions of the image sensor provided that they are previously stored in a memory of the image sensor that is accessible by the reconfiguration tool, while the memory is integrated or not within the display system 10.

The image processing module 14 that is capable of determining in real time the drift D of the aircraft, comprises a tool for analyzing the images delivered (i.e. captured) by the image sensor 12 (not shown).

More precisely, such a tool for analyzing captured images is able to automatically determine the camera's drift $D_{camera}$ by analyzing at least two successive images captured, wherein the drift $D_{camera}$ is equal to the angle of displacement of the pixels of one image with respect to another relative to a predetermined constant axis for all the images. Then, from the drift $D_{camera}$ of the camera, the drift D of the aircraft relative to its target cap $C_C$ is obtained by the analysis tool by applying a correction matrix, referred to as benchmark harmonization, which makes it possible to pass from the camera reference frame to the aircraft's reference frame, wherein such a drift D of the aircraft corresponds to the angle between the longitudinal displacement and the lateral displacement of the aircraft, and therefore to the drift D thereof.

In other words, the angle of drift D of the aircraft is, for example, expressed by the following relation: $D=\tan^{-1}(DEPlatDEPlong)$.

Such a drift D of the aircraft is therefore suitable to be obtained by the analysis tool by means of different image processing methods (for example optical flux processing methods, detection and monitoring methods for tracking pixels, . . . ) and operation(s) to change the reference frame (i.e. reference harmonization correction) in order to pass from the camera reference frame (i.e. image sensor reference frame 12) to the reference frame of the aircraft in order to retranscribe the drift $D_{camera}$ camera (itself obtained in the camera repository) in the reference frame of the aircraft.

In particular, the image analysis tool is an optical odometry tool capable of implementing a visual odometry process that is capable of estimating the rotation and/or the translation of the camera between two instants of capturing two images that are acquired successively by the image sensor 12 as the aircraft is traveling, in order to reconstruct the scene that is representative of the moving environment of the camera and to position the camera there.

In general, as illustrated in particular by the document "Visual Odometry" by D. Nister et al. CPVR 2004, visual odometry is based on the detection of points of interest in at least two successive POI (Point of Interest) images, followed by their pairing and estimation of the movement of these points between the two temporal instants of capture of the two successive images in question.

For example, one odometry technique corresponds to the Simultaneous Localization and Mapping (SLAM) technique as described in particular in "Simultaneous map building and localization for an autonomous mobile root." by J. Leonard et al., wherein a particular variant of PTAM (Parallel Tracking And Mapping) is able to estimate the position of the camera comprising the image sensor 12 in a three-dimensional (3D) environment.

More precisely, the optical odometry tool is first of all suitable for implementing a filter of the image data delivered by the image sensor 12, for example a Kalman filter, a Wiener filter or treatment of wavelet image data.

Then, the odometry tool comprises a point of interest detector, such as a Moravec detector, a Harris detector or a Forstner detector.

Then, to establish the pairing of points of interest of two successive images, the odometry tool is able to establish the correspondence of points in two successive images (matching) by using for example:

Scale-Invariant Feature Transform (SIFT), or
an image transformation technique based on Speeded Up Robust Features (SURF) using an approximation of Haar wavelets, or
an alternative image transformation technique, called ORB (Oriented FAST and Rotated BRIEF) as described in particular in "ORB: an efficient alternative to SIFT or SURF" by Rublee et al. based on a feature descriptor derived from accelerated segment tests (FAST—Features of Accelerated Segment Test) and a binary visual descriptor, for example BRIEF (Binary Robust Independent Elementary Features), or an image transformation technique based on the measurement of optical flows (optical flows or visual scrolling).

According to another particular aspect, the odometry tool is able to take into account the epipolar geometry of the different successive images processed by the image processing module 14 and delivered by the image sensor 12.

When the image sensor 12 is mounted on a helmet worn by the pilot of the aircraft, the image processing module 14 further comprises (an) image correction tool(s) (not shown) that is/are suitable for correcting the images acquired before or after their analysis, by applying corrections that are configured to act on the attitude and the scale factor applied during the image acquisition by the image sensor 12.

In other words, such a correction tool is configured to be connected upstream or downstream of the analysis tool (i.e. directly on the computed drift information $D_{camera}$) of the image processing module previously described.

More specifically, such an image correction tool is capable of re-projecting each image acquired by the image sensor in a geographical horizontal plane from at least one datum delivered by a sensor external to the image processing module (14) (i.e. external to the box containing the correction tool).

In particular, such data belongs to the group comprising at least:
- one or more items of information that is/are representative of the attitude of the aircraft,
- one or more items of information that is/are representative of the height of the aircraft above the ground,
- an item of information that is representative of the visual field of the image sensor 12.

More specifically, according to the present example where the device is an aircraft, the information that is representative of the pitch required for the projection may be given either by a radio altimeter or, failing that, by the use of synthetic height calculated as Mean Sea Level (MSL) minus the terrain height stored within a database in an aircraft memory. The MSL altitude may be obtained:
- either by a module 16 for determining information that is representative of the route followed by the aircraft, namely a GPS or Gallileo geolocation system of the aircraft,
- or by corrected air pressure information.

In other words, such a projection in a geographical horizontal plane is able to take into account the attitude of the aircraft and/or the scale factors of the image sensor 12 as a function of the navigation height.

Without the correct correction tool to implement such a projection, an attitude change could potentially be confused with a change of drift D of the aircraft.

As indicated above, the module 16 for determining a representative $I_T$ information of the route (track) corresponds, for example, to the GPS or Gallileo geolocation system of the aircraft, or, according to another example, to the flight management system (FMS).

From the information that is representative of the route and the drift D, the true heading $H_T$ may be determined in real time by the module 18 for determination of the true heading.

More precisely, the true heading $H_T$ is obtained in real time by the module 18 for determination of the true heading, and that is able to subtract the drift D from the information that is representative of the $I_T$ route, of where: $H_T=I_T-D$.

Then, the module 18 for determination of the true heading $H_T$ is able to transmit this true heading $H_T$ to at least to the user return module 20 that is able to return to a user, namely to the pilot(s) when the device corresponds to an aircraft, information that is representative of this true heading $H_T$.

Advantageously, according to a second approach of the present invention, the user return module 20 is a display module capable of recalibrating a synthetic image and/or a conforming symbology with the external environment in the line of sight of the device associated with the device, wherein the display module belongs to the group comprising at least:
- a head-up display module capable of projecting the synthetic head-up image to the device;
- a head-up display module capable of projecting the synthetic mounted head-up image to at least one user of the device;
- a head-down display module capable of projecting the synthetic head-down image of the device.

In other words, the present invention makes it possible to correct the display of the synthetic image and/or of the conforming symbology (i.e. recalibration of the heading of the synthetic image is obtained) in the head-up and/or mounted head-up image and/or even head-down image so that the synthetic image of the piloting aid is centered precisely on the axis of displacement of the aircraft, wherein such an axis of displacement corresponds to the true heading $H_T$ obtained previously.

According to an optional aspect, the module for determination of the true heading $H_T$ is also able to transmit this true heading $H_T$ to other avionics modules 26, that are able to use heading information, like the user return module 20. For example, this true heading $H_T$ is transmitted to the low-cost AHRS which comprises a magnetometer, in order to recalibrate it in the event of discrepancy between the magnetic heading and this true heading $H_T$.

The observation and storage of AHRS D drift over time is also potentially useful for allowing predictive maintenance in order to detect a latent failure.

Furthermore, when the image capture implemented by the image sensor 12 is no longer available, the memory of the device is able to keep the last difference E between true heading and the sum of the magnetic heading and the magnetic declination, and return it to the module 18 for real-time determination of the true heading, and able in this case, to add this difference E to the AHRS magnetic course in order to continue to benefit from a true heading $H_T$ (which will drift, as long as the acquisition of the image remains unavailable, in particular during turning phases, when the intrinsic AHRS magnetic heading error tends to increase (the measurement of the magnetometer is filtered using a gyromagnetic loop that is sensitive to the errors of the gyroscopes when turning).

Figure 2:
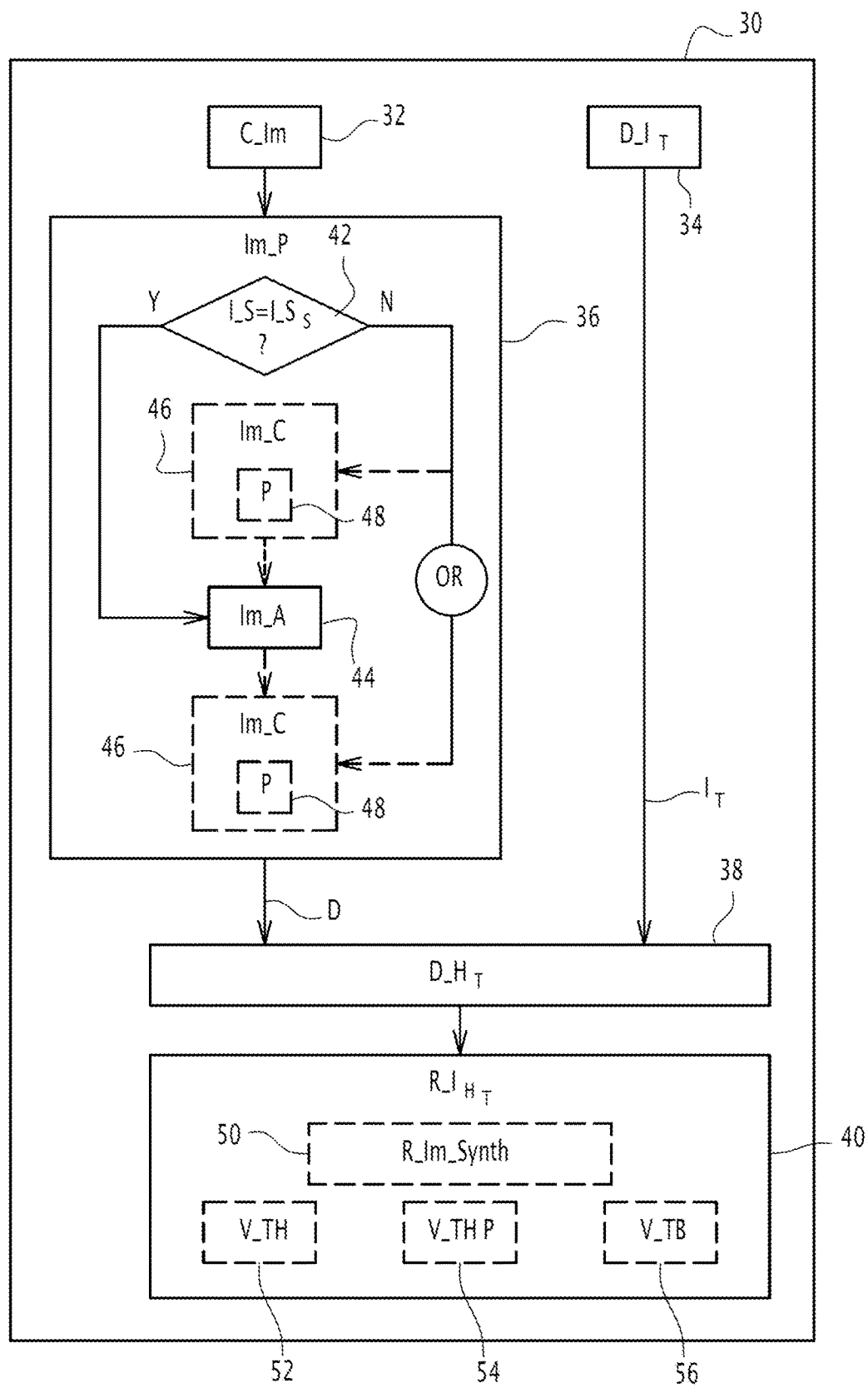
FIG. 2 shows a flowchart of a display method according to the invention.

As an alternative in the case above where the image acquisition implemented by the image sensor 12 is no longer available, the module 18 for real-time determination of the true heading is suitable for implementing a Kalman filtering having the AHRS magnetic heading and the heading of the camera (i.e. the image sensor 12 embedded in the camera) as input, and being able to optimize the instantaneous use of these two inputs of the Kalman filter according to their availability in real time according to an optimization rule defined beforehand. In relation with FIG. 2, the display method implemented by the display system according to the present invention is described below.

In general, the method comprises two first steps 32 and 34 for image acquisition by the image sensor and determination of $I_T$ information that is representative of the route followed by the aircraft implemented successively (in accordance with any order of execution of these first two steps) or in parallel.

The image acquisition step 32 is followed by an image processing step 36 during which the d drift D of the device, namely the aircraft, is determined in real time as the successively acquired images are processed.

From the drift D and the $I_T$ information that are representative of the route, a step 38 for determining the true heading $H_T$ is implemented.

Then, according to a step 40, information representative of this cap true $H_T$ is returned to the user, namely at least one pilot.

More precisely, the image processing step 36 comprises, according to a particular aspect, a step 42 of checking (i.e. testing) the type of image sensor 12 used.

In particular, if (Y) the image sensor 12 is gyro-stabilized, the image processing step 36 comprises only a step 44 of image analysis by implementing, for example, a visual odometry technique such as detailed previously and specific in order to determine the drift D of the aircraft from the camera drift $D_{camera}$ by change of reference frame (i.e. harmonization correction of reference frames) to go from the camera reference frame (i.e. reference frame of the image sensor 12) to the reference frame of the aircraft in order to retranscribe the camera drift $D_{camera}$ (itself obtained in the camera reference frame) in the reference system of the aircraft.

In the opposite case (N) (i.e. the image sensor 12 is not gyro-stabilized but mounted on a helmet worn by the pilot of the aircraft), the image processing step 36 comprises an additional step 46 of correction of the data associated with the acquired images, namely: the data issued directly from the image sensor 12 or the drift data D of the aircraft obtained after the step 44 of image analysis.

More precisely, the image data correction step 46 comprises, for example, a projection step 48 in a geographical horizontal plane taking into account at least one predetermined datum, namely for example:
  one or more items of information that are representative of the attitude of the aircraft,
  one or more items of information that are representative of the height of the aircraft above the ground,
  an information that is representative of the visual field of the image sensor 12.

With regard to the step 40 of return to a user of the device, namely, for example, a pilot of the aircraft, such a step 40 comprises a step 50 of recalibrating a synthetic image comprising piloting information in the axis of movement of the device associated with the true heading $H_T$ calculated in real time according to the invention.

For example, such a recalibration 50 makes it possible to readjust the synthetic image in the axis of the true heading of the aircraft even before seeing the runway during an approach to land.

Such a synthetic image and/or conforming symbology recalibrated in the axis of the true heading $H_T$ is projected by superposition on the piloting environment of the user, for example according to three steps 52, 54, 56 for the possible visualization that is manually activatable and/or automatically selected according to the type of device used, namely a head-up display step 52, a mounted head-up display step 54, or a head-down display step.

It is thus conceivable that the invention allows real-time optimization of the display of (a) synthetic image(s) and/or of conforming symbology including information of help to the user according to the true heading $H_T$ followed by the device, and by avoiding including the implementation of an expensive inertial unit or by avoiding the use of a complex database to be enriched and/or updated.

The invention claimed is:

1. A display system that is included in an air navigation device, wherein the air navigation device is capable of traveling along a path between at least two distinct points and using at least one heading datum, and wherein the display system comprises at least:
  an image sensor capable of acquiring environmental images along the path traveled by the air navigation device;
  an image processing module configured to determine the drift caused by the air navigation device traveling through the air via a drift angle of the air navigation device in real time;
  a geolocation system configured to determine information that is representative of the route taken by the air navigation device;
  a real-time determination module in communication with the image processing module and the geolocation system, wherein the real-time determination module is configured to determine a true heading followed by the air navigation device from the information that is representative of the route taken by the air navigation device and the drift of the air navigation device determined by the drift angle; and
  a user return module in communication with the real-time determination module, wherein the user return module is configured to return to a user of the air navigation device information that is representative of the true heading.

2. The display system according to claim 1, wherein the user return module is a display module configured to recalibrate a synthetic image and/or a conforming symbology in the line of sight of the air navigation device associated with the true heading, wherein the display module is selected from the group consisting of:
  a head-up display configured to project the synthetic image to the user of the air navigation device;
  a mounted head-up display configured to project the synthetic image to the user of the air navigation device on the mounted head-up display worn by the user;
  a head-down display configured to project the synthetic image to the user of the air navigation device.

3. The display system according to claim 1, wherein the image processing module comprises an image analysis tool for automatically determining the drift of the air navigation device by analyzing at least two successive acquired environmental images, wherein the drift is obtained from an angle of displacement of the pixels between one image and another image, wherein the angle of displacement of the pixels is associated with the angle between a longitudinal displacement and a lateral displacement of the air navigation device.

4. The display system according to claim 3, wherein the image analysis tool is an optical odometer.

5. The display system according to claim 1, wherein the image sensor is pointed towards the ground.

6. The display system according to claim 1, wherein the image sensor has a field of view that is reconfigurable according to the instantaneous roll rate and/or instantaneous pitch rate of the air navigation device and/or as a function of the phase of the travel of the air navigation device.

7. The display system according to claim 1, wherein the image sensor is integral with the axes of the air navigation device or is gyro-stabilized.

8. The display system according to claim 3, wherein the image processing module further comprises (an) image correction tool(s) that is/are capable of correcting the acquired environmental images before or after their analysis.

9. A display method implemented by a display system included in an air navigation device that is able to travel a path between at least two distinct points and to use at least one heading datum, wherein the method comprises:
  acquiring environment images along the path traveled by the air navigation device;
  processing the acquired environmental images to determine the drift caused by the air navigation device traveling through the air via a drift angle of the air navigation device in real time;
  determining information that is representative of the route taken by the air navigation device;
  determining in real time a true heading followed by the air navigation device from the information that is representative of the route taken by the air navigation device and the drift of the air navigation device determined by the drift angle; and returning to a user of the air navigation device information that is representative of the determined true heading followed by the air navigation device.

10. A computer program comprising software instructions which, when executed by a computer, implement the display method according to claim 9.

* * * * *